United States Patent Office 3,395,973
Patented Aug. 6, 1968

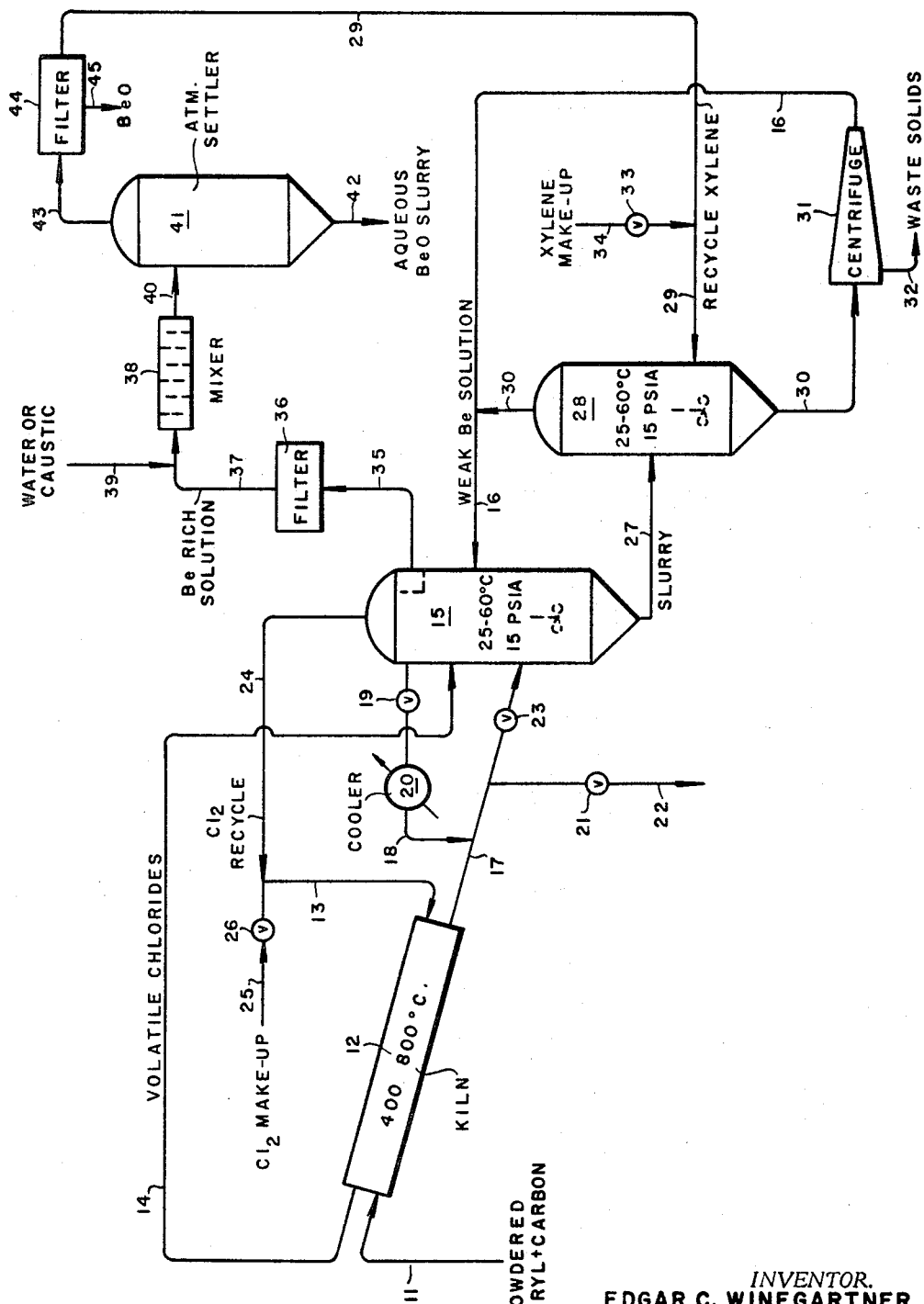

3,395,973
SEPARATION OF BERYLLIUM HALIDES FROM OTHER METAL HALIDES
Edgar C. Winegartner, Baytown, Tex., and David G. Walker, Madison, N.J.; said Winegartner assignor to Esso Research and Engineering Company
Filed Oct. 1, 1965, Ser. No. 491,923
9 Claims. (Cl. 23—15)

ABSTRACT OF THE DISCLOSURE

Beryllium is separated by contacting a mixture containing beryllium halide contaminated with other metal halides with an aromatic hydrocarbon solvent to form a solution of beryllium halide which is separated from the other metal halides which are in suspension; beryllium is recovered from the solution. Beryllium-containing ores may be treated with halogens to form the halides which are then dissolved in the solvent.

---

The present invention is directed to recovery of beryllium. More particularly, the invention is concerned with the recovery of beryllium from beryllium-containing ores. In its more specific aspects, the invention is concerned with separating and recovering beryllium from a mixture containing beryllium halide contaminated with other metallic halides.

In accordance with the present invention, beryllium is separated by contacting a mixture containing beryllium halide contaminated with other metallic halides with an aromatic hydrocarbon solvent to form a solution of beryllium halide in said solution containing said other metallic halides in suspension in said solution. The solution is separated from the suspended metallic halides and beryllium is recovered from the solution.

The aromatic hydrocarbon solvent is suitably a monocyclic aromatic hydrocarbon such as benzene, toluene, xylene, tetramethyl benzene and other alkyl substituted aromatic hydrocarbons. The monocyclic hydrocarbons employed as a hydrocarbon solvent may suitably boil at temperatures in the range of about 180° F. to about 400° F.

The beryllium-containing ores which may be employed in the practice of the present invention include by way of illustration, and not by way of limitation, beryl, chrysoberyl, phenacite, bertrandite and the like. There are about 30 recognized minerals which contain beryllium. However, the more important minerals containing beryllium are beryl, chrysoberyl and phenacite. Commercial grades of beryl may contain about 11–13% beryllium oxide, 17–19% aluminum oxide, 67–70% silicon dioxide, 1–2% alkali metal oxides, 1–2% iron and other oxides. Bertrandite is a hydrated beryllium silicate which contains beryllium oxide in the amount of about 0.5% to about 1.5%, 60–80% silicon dioxide, 10–15% alumina, 1–5% calcium carbonate, 2–3% manganese and 1–2% ferrous oxide. The composition of the several beryllium-containing minerals including, but not limited to, chrysoberyl, bertrandite and phenacite are also known and may be found in the literature.

The halogens employed in the present invention include chlorine, bromine, fluorine and iodine of which chlorine is preferred. While chlorine may be used in forming the halides of beryllium and the contaminating metals, carbon tetrachloride alone or in admixture with chlorine may be employed.

The beryllium-containing minerals may be converted to the halides such as chlorides by roasting in a kiln in the presence of carbon and in contact with chlorine and/or carbon tetrachloride alone or in admixture at temperatures in the range of about 400° C. to 800° C. About 200% to about 1000% by weight of the halogen based on the beryllium and the contaminating metals may be employed.

In forming a solution of beryllium halide in hydrocarbon, the contaminated beryllium halide may be contacted with the aromatic hydrocarbon in the liquid phase at temperatures in the range from about 25° C. to about 60° C. at pressures about 14 to about 250 p.s.i.a. The amount of the aromatic hydrocarbon solvent used may vary from about 900% to about 9000% by weight based on the amount of beryllium chloride. Ordinarily, an amount sufficient to form a solution of beryllium chloride and to suspend the undissolved other contaminating metal halides will be used. As a result of such contacting operations, a solution of beryllium halide in aromatic hydrocarbon is formed with the other metallic halides remaining suspended in the aromatic hydrocarbon. Thereafter the suspended solids are separated from the solution and the solution may then be further treated for recovery of the beryllium.

The present invention will be further illustrated by reference to the drawing which is a flow diagram of a preferred mode.

Referring now to the drawing, numeral 11 designates a charge line by way of which a mixture containing from about 90% to about 50% by weight of a beryllium-containing mineral such as beryl and from about 10% to about 50% by weight of carbon is charged into a kiln 12 as a powderous mixture. In the kiln 12, which is suitably at a temperature in the range of 400° C. to 800° C., the beryl and carbon are contacted with dry chlorine gas introduced by way of line 13 such that the gas contacts the powdered beryl and carbon countercurrently. As a result of the reaction taking place in the kiln 12, which is suitably rotatable, volatile halides such as chlorides are formed and discharged from kiln 12 by line 14 and introduced thereby into a drum 15. A weak solution of beryllium in aromatic hydrocarbon solvent from a source which will be described further is discharged into drum 15 by line 16. Also introduced into drum 15 are solids from kiln 12 which are discharged by way of line 17 into drum 15. These solids are contacted with solution from drum 15 introduced into line 17 by line 18, the solution being withdrawn from drum 15 by opening valve 19 in line 18 and passing the withdrawn solution through cooler 20 wherein the temperature is reduced to a temperature in the range of about 25° C. to 60° C. Optionally, the solids in line 17 may be discharged from the operation by opening valve 21 in line 22. In this event, valve 23 will be closed and valve 19 and line 18 will also be closed. Chlorine is recycled to line 13 from drum 15 by way of line 24 and line 13 and makeup chlorine may be introduced into line 13 by line 25 controlled by valve 26.

A slurry of metal halides as illustrated by iron and aluminum halides in the aromatic hydrocarbon solvent is withdrawn from drum 15 by line 27 and introduced thereby into a second drum 28 which is also suitably at a temperature from about 25° C. to about 60° C. and at a pressure of about 15 p.s.i.a.

Aromatic hydrocarbon solvent such as xylene is introduced into drum 28 by line 29 from a source to be described further. Discharged from the top of drum 28 by line 30 is a weak solution of beryllium halide which is returned to drum 15 by line 16. Solids which have been separated in the conical portion of drum 28 are withdrawn by line 30 and separated in centrifuge 31 with the solids being removed by line 32 and the weak beryllium halide solution recycled to drum 15 by line 16. Makeup xylene is introduced from a source not shown by opening valve 33 in line 34.

The beryllium halide solution in drum 15 is withdrawn from drum 15 by line 35 and any contaminating metal halide particles are removed in filter 36 leaving a beryllium halide enriched solution which may contain as much as 5% by weight beryllium halide which is recovered by line 37. The beryllium halide, such as beryllium chloride, is then introduced by line 37 into an incorporator 38 for admixture with the water or caustic soda solution introduced by line 39. The water or caustic soda solution converts the beryllium halide to beryllium oxide which is in the form of a slurry in the aromatic hydrocarbon solvent and the aqueous material introduced by line 39. The admixture then discharges by line 40 into atmospheric settling drum 41 in which a separation is made between the aqueous-beryllium oxide slurry and the hydrocarbon-beryllium oxide slurry, the aqueous slurry being discharged by line 42 for recovery of the beryllium therefrom while the aromatic hydrocarbon slurry is withdrawn by line 43 into a filter 44 where beryllium oxide is separated and removed by line 45. The aromatic hydrocarbon solvent such as xylene is recycled by line 29 as described.

The beryllium may suitably be recovered from beryllium oxide by well known methods such as those described in the book, "The Metal Beryllium" by D. W. White and J. E. Burke; Am. Soc. for Metals, 1959, p. 84; or the oxide itself may be used as a refractory or for those other uses to which it is usually put. The more common methods of separating beryllium from its oxide involve solution of the oxide in ammonium bifluoride solution, purification of the solution, separation of beryllium fluoride, and reduction of the beryllium fluoride to beryllium metal in an electric furnace using magnesium metal as a reducing agent.

The present invention is quite advantageous and useful since beryllium may be separated by forming a mixture of beryllium halides, the berylllium halides being selectively extracted by use of an aromatic hydrocarbon solvent. For example, beryllium chloride forms at temperatures less than 150° F. a solution containing up to 5% by weight of beryllium chloride in a mixture of para-, meta- and ortho-xylenes. At these temperatures, iron and aluminum chloride, which are contaminants, are substantially insoluble. This allows a separation to be made between beryllium halide and its metallic halide contaminants. Thus, in accordance with the present invention, once a solution of the beryllium halide in an aromatic hydrocarbon solvent is formed, the contaminants may be separated mechanically by filtration or centrifugation. The contaminants which are insoluble may be allowed to settle and the beryllium solution decanted for recovery of the beryllium halide.

While one mode of separating and recovering beryllium chloride has been disclosed, the beryllium chloride may be separated by reaction or displacement with other metals or it may be recovered by converting the beryllium to its oxides and heating to drive off the halides as gaseous hydrogen halides.

The mechanism by way of which beryllium halide is dissolved in the aromatic hydrocarbon solvent is not completely understood but, by way of hypothesis, the beryllium halide is believed to form a complex with the aromatic hydrocarbon and thus forms a solution.

The invention provides a simple mode of separating beryllium from its ores and also separating beryllium halides from mixtures containing beryllium halides such as beryllium chloride contaminated with other metallic halides.

The nature and objects of the present invention having been completely described and illustrated, and the best mode contemplated set forth, what we wish to claim as new and useful and secure by Letters Patent is:

1. A method of separating beryllium which comprises contacting a mixture containing beryllium chloride contaminated with other metallic chlorides with a monocyclic aromatic hydrocarbon solvent boiling in the range of about 180° to about 400° F. in the liquid phase at a temperature from about 25° to about 60° C. to form a solution of beryllium chloride in said solvent containing said other metallic chlorides in suspension in said solution, separating said solution from said suspended metallic chlorides, and recovering beryllium from said solution, the aromatic hydrocarbon solvent being in an amount from about 900% to about 9000% by weight based on the amount of beryllium chloride.

2. A method of separating beryllium which comprises contacting a mixture containing beryllium chloride contaminated with other metallic chlorides with a xylene solvent in the liquid phase at a temperature below about 150° F. to form a solution of beryllium chloride in said solvent containing said other metallic chlorides in suspension in said solution, separating said solution from said suspended metallic chlorides, and recovering beryllium from said solution, the xylene solvent being in an amount from about 900% to about 9000% by weight based on the amount of beryllium chloride.

3. A method of separating beryllium which comprises contacting a mixture containing beryllium chloride contaminated with other metallic chlorides with a monocyclic aromatic hydrocarbon solvent boiling in the range of about 180° to about 400° F. in the liquid phase at a temperature from about 25° to about 60° C. to form a solution of beryllium chloride in said solvent containing said other metallic chlorides in suspension in said solution, separating said solution from said suspended metallic chlorides, recovering beryllium chloride from said solution, converting said beryllium chloride to the corresponding oxide, and recovering said oxide, the aromatic hydrocarbon solvent being in an amount from about 900% to about 9000% by weight based on the amount of beryllium chloride.

4. A method of separating beryllium from its ores which comprises converting a beryllium containing ore to a mixture containing beryllium chloride contaminated with other metallic chlorides, contacting said mixture with a monocyclic aromatic hydrocarbon solvent boiling in the range of about 180° to about 400° F. in the liquid phase at a temperature from about 25° to about 60° C. to form a solution of beryllium chloride in said solvent containing said other metallic chlorides in suspension in said solution, separating said solution from said suspended metallic chlorides, and recovering beryllium from said solution, the aromatic hydrocarbon solvent being in an amount from about 900% to about 9000% by weight based on the amount of beryllium chloride.

5. A method in accordance with claim 4 in which the beryllium-containing ore is converted by treatment with chlorine at a temperature between about 400° C. and 800° C.

6. A method in accordance with claim 5 in which the beryllium-containing ore is beryl and said chlorine treatment is in the presence of carbon.

7. A method of separating beryllium which comprises contacting a mixture containing beryllium chloride contaminated with iron and aluminum chlorides with a monocyclic aromatic hydrocarbon solvent boiling in the range from about 180° to about 400° F. in the liquid phase at a temperature below about 150° F. to form a solution of beryllium chloride in said solvent containing said iron and aluminum chlorides in suspension in said solution, separating said solution from said suspended iron and aluminum chlorides, and recovering beryllium from said solution, the aromatic hydrocarbon solvent being in an amount from about 900% to about 9000% by weight based on the amount of beryllium chloride.

8. A method in accordance with claim 7 in which the aromatic hydrocarbon is a xylene.

9. A method in accordance with claim 8 in which the xylene is a mixture of xylenes.

References Cited

Everest: "The Chemistry of Beryllium," Elsevier Publishing Co., New York, 1964, pp. 123–126.

Moore: "Purification of Beryllium Compounds: A Literature Survey," U.S. Atomic Energy Commission Report ORNL–2938, June 16, 1960, pp. 21–25.

OSCAR R. VERTIZ, *Primary Examiner.*

HERBERT T. CARTER, *Assistant Examiner.*